United States Patent
Sohn

(10) Patent No.: US 9,364,122 B2
(45) Date of Patent: Jun. 14, 2016

(54) TOWEL

(71) Applicant: Dae Up Sohn, Seoul (KR)

(72) Inventor: Dae Up Sohn, Seoul (KR)

( * ) Notice: Subject to any disclaimer, the term of this patent is extended or adjusted under 35 U.S.C. 154(b) by 12 days.

(21) Appl. No.: 14/377,502

(22) PCT Filed: Jan. 14, 2013

(86) PCT No.: PCT/KR2013/000279
§ 371 (c)(1),
(2) Date: Aug. 7, 2014

(87) PCT Pub. No.: WO2013/118976
PCT Pub. Date: Aug. 15, 2013

(65) Prior Publication Data
US 2015/0004352 A1    Jan. 1, 2015

(51) Int. Cl.
| | | |
|---|---|---|
| A47K 10/02 | (2006.01) | |
| A45F 5/04 | (2006.01) | |
| A47L 13/16 | (2006.01) | |
| A45F 5/02 | (2006.01) | |
| A47L 13/51 | (2006.01) | |
| A45C 11/00 | (2006.01) | |
| H04M 1/21 | (2006.01) | |

(52) U.S. Cl.
CPC . *A47K 10/02* (2013.01); *A45F 5/02* (2013.01); *A45F 5/04* (2013.01); *A47L 13/16* (2013.01); *A45C 2011/002* (2013.01); *A45C 2200/15* (2013.01); *A45F 2200/0516* (2013.01); *A47L 13/51* (2013.01); *H04M 1/21* (2013.01); *Y10T 428/24008* (2015.01)

(58) Field of Classification Search
CPC ........................................... A47K 10/02
USPC ............................................. 428/99
See application file for complete search history.

(56) References Cited

U.S. PATENT DOCUMENTS

| | | | | |
|---|---|---|---|---|
| 6,276,828 B1* | 8/2001 | Otley | .......................... | A45F 4/02 224/576 |
| 2004/0155077 A1* | 8/2004 | Cullen | ..................... | A45C 3/10 224/153 |
| 2011/0047697 A1* | 3/2011 | McBrearty | ............. | A47G 9/062 5/417 |
| 2013/0098954 A1* | 4/2013 | Inglis | ....................... | A45F 5/00 224/148.4 |

FOREIGN PATENT DOCUMENTS

| | | |
|---|---|---|
| JP | 2004-283368 A | 10/2004 |
| JP | 2010-013741 A | 1/2010 |
| KR | 20-0326363 Y1 | 9/2003 |
| KR | 20-0411064 Y1 | 3/2006 |
| KR | 10-0775289 B1 | 11/2007 |
| KR | 10-2009-0013849 B1 | 2/2009 |
| KR | 20-2009-0005115 U | 5/2009 |
| KR | 20-2010-0012646 U | 12/2010 |

* cited by examiner

*Primary Examiner* — Alexander Thomas
(74) *Attorney, Agent, or Firm* — Novick, Kim & Lee, PLLC; Jae Youn Kim

(57) ABSTRACT

Disclosed is a towel in which a pouch is not provided and the decoupling of a towel body is possible, so that the towel can sufficiently washed and freely used in various fields. The towel is coupled to a portable terminal, a bag, a purse, a key holder, a diary, or a handbag. The towel includes a towel body, a pocket part provided on one surface of the towel body to receive the towel body, a connection member coupled to the pocket part, and a coupling member mounted in the connection member. As the towel is used, the pouch is not provided different from a conventional towel, so that the size of the towel is reduced and the fabrication cost is saved.

6 Claims, 14 Drawing Sheets

// TOWEL

TECHNICAL FIELD

The present invention relates to a towel having improved decorative, portable, and storage properties so that the use convenience of the towel can be enhanced, and more particularly to a towel in which a pouch is not provided and the decoupling of a towel body is possible, so that the towel can sufficiently washed and freely used in various fields.

In particular, the present invention relates to a towel including a towel body having a cleaner function, cleaning a glass surface of a display of a portable terminal, glasses, or an optical device, and used for decorating a portable terminal, a bag, a purse, a key holder, a diary, and a handbag.

In addition, a portable terminal used in the present invention is collectively called a terminal equipped with a memory having a limited capacity and a display and carried by a hand of a user for the use thereof. The portable terminal includes smartphones designed by adding a computing function to various cellular phones and voice-based terminals, various personal digital assistant (PDA) series, and wireless PDAs having a wireless function added to the PDA series. For example, the terminal includes "iPad" manufactured by Apple Inc. and "GALAXY Tab" manufactured by Samsung electronics Co. Ltd, which become commercially available.

BACKGROUND ART

In general, a towel is a cotton product woven with a nap by using a cotton thread in order to remove moisture, sweat, or various foreign matters from a face or a human body. Since the towel is provided therein or on the surface thereof with an uncut pile, the towel represents superior absorption and ventilation properties, and is classified into a large-size bath towel used in taking a bath, a middle-size facial towel, a handkerchief that may be received in a pocket and carried, a towel for removing a sweat during exercising or working, and a cleaner towel used to clean glasses according to the uses thereof. Cloth woven for the purpose of a towel is called "towel cloth". Since the towel cloth sufficiently absorbs moisture, the towel cloth is used to fabricate a single-layer quilt for the summer or pajamas.

In addition, recently, as a display of a portable terminal is enlarged in, and a touch screen is used, a user brings a microphone or a speaker of a portable terminal into contact with an ear or a mouth of the user, or places the micropohone or the speaker of the portable terminal in close to the ear or the mouth of the user for the communication with an the other party. Accordingly, since costmetics or the facial grease of the user, and dust is stained on the display and the outer portion of the portable terminal, a screen image is blurred and an image on a liquid crystal display is not uniformly viewed.

Accordingly, since the outer portion of the portable terminal is stained with foreign matters such as dust, the user frequently cleans the outer portion of the portable terminal. This is because the user feels inconvenient to view the portable terminal if the foreign matters are attached to the display of the portable terminal, and a sanitary problem may be caused if foreign matters are attached to the speaker or the microphone. Therefore, a user may scrub the outer portion of the portable terminal to clean the portable terminal or clean the outer portion of the portable terminal by additionally using tissue.

However, the user may not carry a towel or a tissue always to clean an outer portion of the portable terminal. In addition, since the outer portion of the portable terminal is always exposed to an external environment, foreign matters such as dust exist on the portable terminal, thereby causing an inferior sanitary condition.

As one example of technologies to solve the above problem, patent document 1 is disclosed.

According to following patent document 1, FIG. 1 shows a perspective view of a cellular phone to which a cleaning tool having a decorative function is attached. In other words, an extensible strap 7 is provided in a portable terminal 5, a strap ring 8 is coupled to an end of the extensible strap 7, and a cleaning tool 6 having a decorative function is coupled to the strap ring 8. In addition, a buffer such as cotton and microfiber are filled in the cleaning tool having the decorative function.

In addition, a towel is disclosed in patent documents 2 and 3 filed by the applicant of the subject application.

For example, FIG. 2 is a partial cut-away perspective view showing the towel shown in patent document 2.

As shown in FIG. 2, a towel 1 includes a pouch 10 having the shape of a pocket to provide a receiving space therein and a towel body 20 received in the pouch 10 and selectively withdrawn out of the pouch 10 for the use thereof.

FIG. 2 shows that the pouch 10 and the towel body 20 detachably coupled to each other by a coupling unit. In other words, the pouch 10 is integrated with a buckle band 17 having both ends protruding outward and inward of the pouch 10 by backstitches in opposition to an entrance to withdraw the towel body 20 or in which the receiving space of the pouch 10 is folded. In addition, the buckle band 17 is formed of cloth having a predetermined width, and has a ring part 18 in which an end exposed to the outside of the pouch 10 is provided in a ring shape. As shown in drawings, a connection link C is connected with the ring part 18.

In addition, a connection band 25 having a predetermined length is integrally coupled with one corner of the towel body 20. The buckle band 17 of the pouch 10 and the connection band of the towel body 20 having the above structure have a coupling unit for the elastic coupling and releasing therebetween. The coupling unit includes an insertion member 29 having a pair of elastic members and a receiving member 19 having an assembling groove into which the elastic members of the insertion member 29 are elastically fitted.

In addition, attachment parts 15$b$ and 15$a$ formed of Velcro are provided at a shielding surface 11 and a cover part 15, respectively, so that the cover part 15 is attached to the shielding surface 11 in the state that the cover part 15 is folded toward the shielding surface 11 to close the entrance.

RELATED ARTS

Patent document 1: Korea Utility Model Registration No. 0326363 (issued on Sep. 1, 2003).

Patent document 2: Korea Patent Registration No. 10-0916367 (published Sep. 7, 2009).

Patent document 3: Korea Patent Registration No. 10-0775289 (published Nov. 8, 2007).

DISCLOSURE

Technical Problem

However, the cotton and the microfiber provided in the cleaning tool 6 having the decorative function according to the related art as shown in FIG. 1 are not sufficient to clean the display of the portable terminal enlarged recently. In addition, the cleaning range of the cleaning tool 6 may be limited according to the length of the strap. Accordingly, the strap having elasticity must be used.

In addition, the cleaning tool shown in FIG. 1 can simply clean only the display of the portable terminal. Further, since the cooling too is formed of cotton and microfiber, most cleaning tools are disposable, and not recycled, thereby causing environment pollution.

In addition, the towel 1 shown in FIG. 2 has the towel body 20 embedded in the pouch 10, so that the whole size of the towel 1 is increased. Accordingly, the towel 1 may not be used in the portable terminal for the decorative purpose. In addition, after the towel body 20 is decoupled from the pouch 10 for the use of the towel 1, an inner part of the pouch 10 must be turned inside out for the recoupling between the towel body 20 and the pouch 10 and the towel body 20 must be coupled to the pouch 10 in the state that the receiving member 19 is exposed outside. In particular, since the pouch is provided, the fabrication cost may be increased.

The present invention is made keeping in mind the problems occurring in the related art, and an object of the present invention is to provide a towel in which a pouch is not provided, and a receiving space is formed in a towel so that the towel body including functional fiber such as microfiber can be easily coupled/decoupled.

Another object of the present invention is to provide a towel in which an entire portion of a towel body can be used and the towel can be used in a portable terminal for a decorative purpose.

Still another object of the present invention is to provide a towel which can be used as a support of a portable terminal so that the portable terminal is supported at a predetermined angle for the use of the portable terminal.

Still another object of the present invention is to provide a towel which can be used as a cleaner to clean a display of a portable terminal and glasses and generally used as a handkerchief.

Technical Solution

In order to accomplish the above objects, there is provided a towel coupled to a portable terminal, a bag, a purse, a key holder, a diary, or a handbag. The towel includes a towel body, a pocket part provided on one surface of the towel body to receive the towel body, a connection member coupled to the pocket part, and a coupling member mounted in the connection member.

In addition, in the towel according to the present invention, the pocket part is provided in a triangular shape at a portion of the towel body.

In addition, in the towel according to the present invention, the pocket part includes a same material as a material constituting the towel body.

In addition, in the towel according to the present invention, the pocket part includes fiber to maintain elasticity different from a material constituting the towel body.

Further, in the towel according to the present invention, the pocket part has a band part having elasticity.

Further, in the towel according to the present invention, the pocket part is provided in a mesh shape.

In addition, in the towel according to the present invention, the pocket part coupled to the connection band has an angle in a range of 50° to 70° at a corner part thereof.

In addition, in the towel according to the present invention, the pocket part includes an anti-slip member.

In addition, in the towel according to the present invention, the coupling member includes a strip or a string.

In order to accomplish the above objects, there is provided a towel coupled to a portable terminal, a bag, a purse, a key holder, a diary, or a handbag. The towel includes a towel body, a gusset part provided on one surface of the towel body to bind the towel body, a connection member formed on an opposite surface of the towel body corresponding to the gusset part, and a coupling member mounted in the connection member.

In addition, in the towel according to the present invention, the gusset part is provided therein with an insertion hole through which the coupling member passes.

In addition, in the towel according to the present invention, the towel body is formed in a polygonal shape, and the gusset part is provided at one side or a corner part of the polygonal shape.

In addition, in the towel according to the present invention, the gusset part is fixed to the towel body by backstitching a portion of the gusset part without the insertion hole.

Further, in the towel according to the present invention, a guide line is provided on one surface of the towel body to bind the towel body.

In addition, in the towel according to the present invention, a fastener or a snap button serving as a bonding unit is provided at both sides of the gusset part.

In addition, in the towel according to the present invention, the coupling member includes a strap or a string.

Advantageous Effects

As described above, according to the towel of the present invention, the pouch is not provided different from that of the related art, so that the size of the towel can be reduced, and the fabrication cost of the towel can be reduced.

In addition, the towel according to the present invention can be used as a cleaner for a display of a portable terminal or glasses, and used as a handkerchief of a user.

Further, according to the towel of the present invention, the entire portion of the towel body is exposed, so that the entire portion of the towel body can be utilized.

In addition, according to the towel of the present invention, the towel body can be prevented from being damaged, and used as a support for a portable terminal.

In addition, according to the towel of the present invention, the pocket part is formed in a mesh shape. Accordingly, even if the wet towel body after the use of the towel body is received in the pocket part, the towel body can be easily dried.

BEST MODE

Mode for Invention

The above object, other objects, and novel property of the present invention will be more cleared by the description of the specification and accompanying drawings.

Hereinafter, the structure of the present invention will be described with reference to accompanying drawings.

Figure 1:
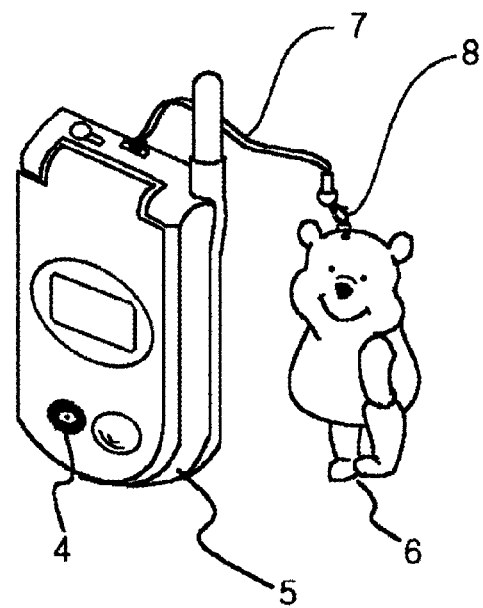
FIG. 1 is a perspective view showing a cleaning tool having a decorative function for a cellular phone according to the related art.
Figure 2:
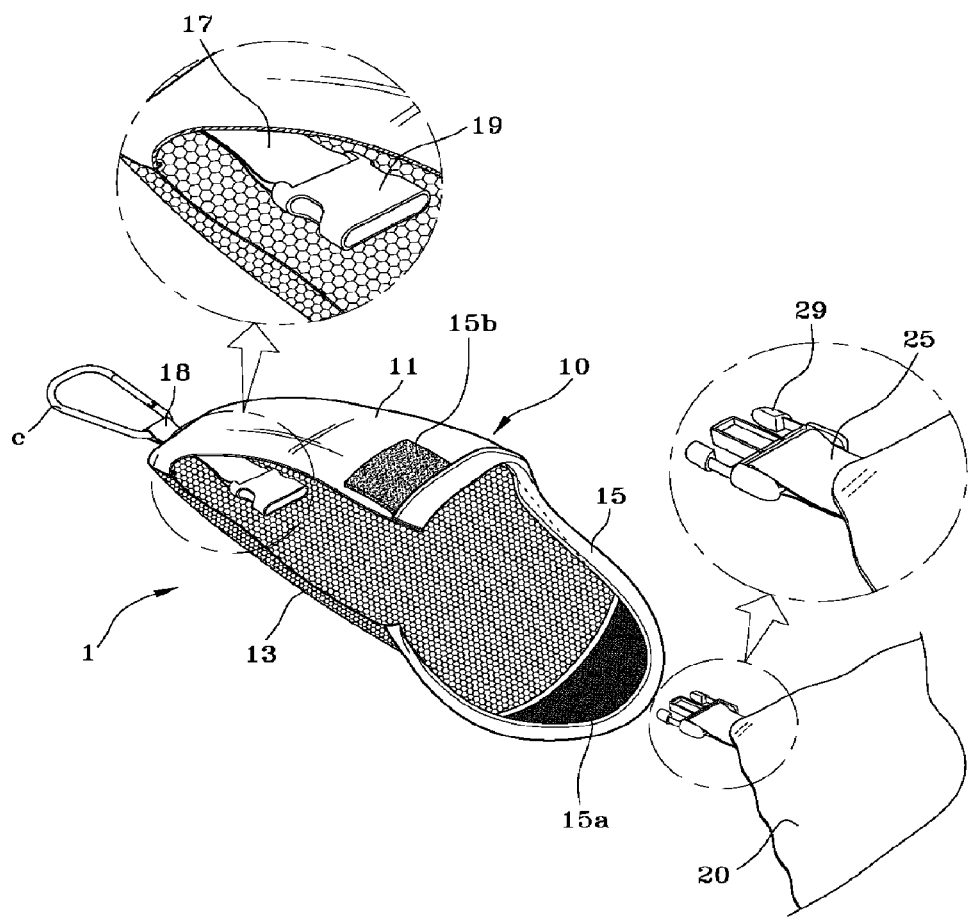
FIG. 2 is a partial cut-away perspective view showing a towel according to the related art.
Figure 3A:
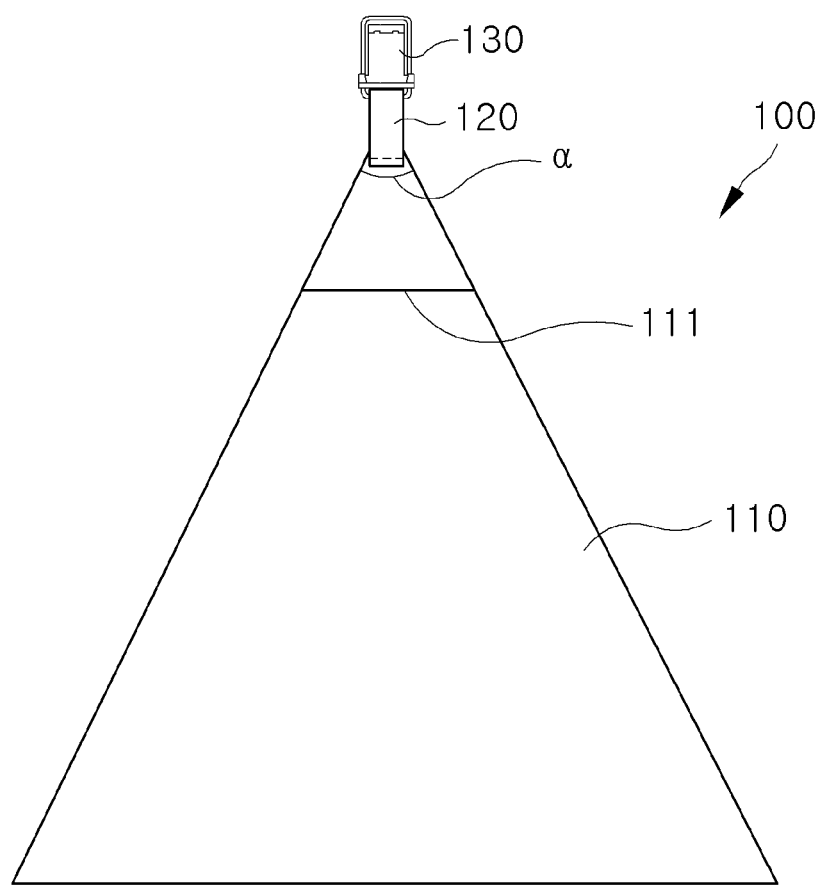
FIG. 3A is an elevational view showing a towel according to one embodiment of the present invention.
Figure 3B:
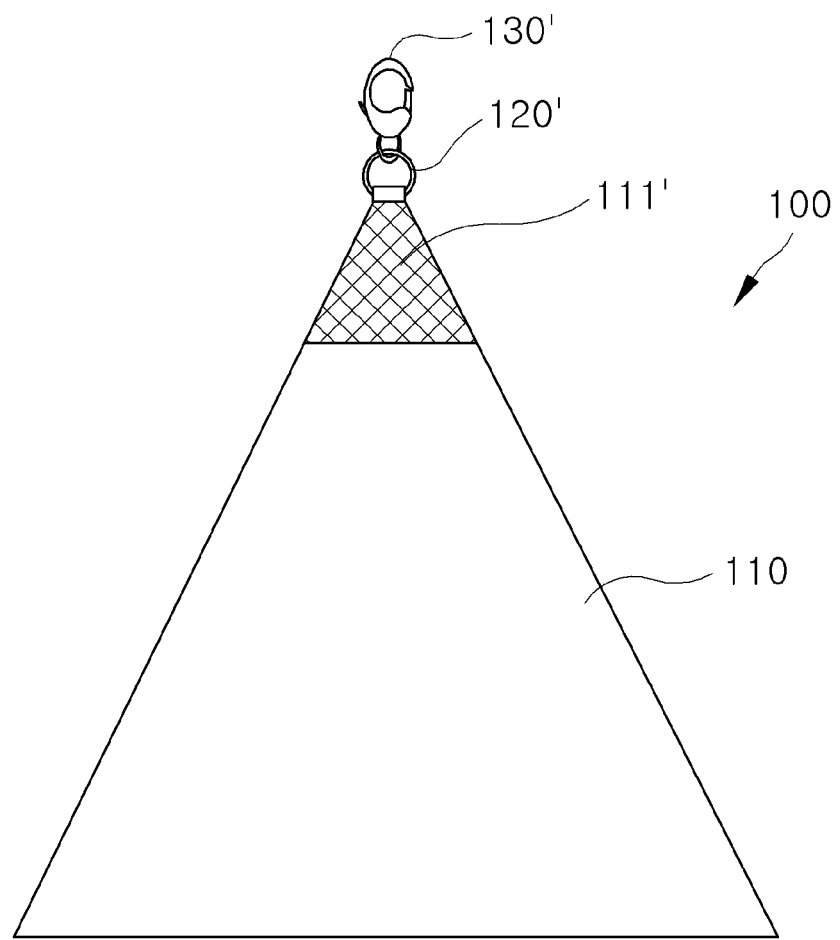
FIG. 3B is an elevational view showing a towel according to another embodiment of the present invention.
Figure 4:
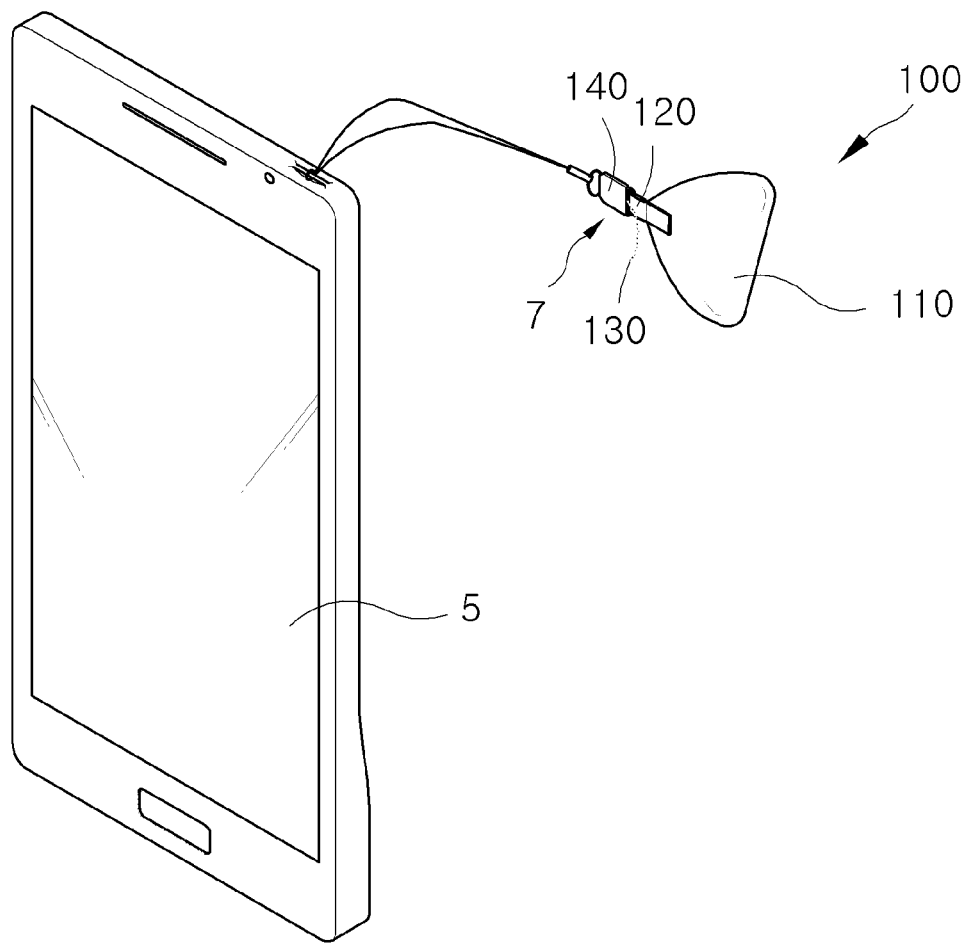
FIG. 4 is a view showing the state that a received towel body is coupled to a portable terminal.

FIG. 3 illustrates perspective views of a towel according to one embodiment of the present invention, and FIG. 4 is a view showing the state that a received towel body is coupled with a portable terminal.

As shown in FIGS. 3 and 4, a towel 100 according to one embodiment of the present invention is coupled to, for example a portable terminal 5, a bag, a purse, a key holder, a diary, or a handbag for a decorative purpose, and includes a towel body 110, a pocket part 111 to receive the towel body 110, and a coupling member 7 coupled to the pocket part 111.

The towel body 110, which is stored in a receiving space of the pocket part 111, is selectively withdrawn out of the pocket part 111 by a user for the use thereof. The towel body 110 is formed of fabric sufficient to smoothly absorb and evaporate sweat or moisture and remove foreign matters. Preferably, the towel body 110 is formed of cotton or fiber serving as functional fabric. If the towel body 110 is not used, the towel body 110 is folded and stored in the pocket part 111.

The coupling member 7 includes insertion members 130 and 130' provided at a connection band 120 serving as a connection member and a receiving member 140 as shown in FIGS. 3 and 4. The coupling member 7 is provided in the shape of a strap as shown in FIG. 3*a* or in the shape of a string as shown in FIG. 3*b*. If the coupling member is provided in the shape of the string as shown in FIG. 3*b*, the connection member may be substituted with a connection ring 120', but the present invention is not limited thereto, and the connection band 120 may be used. In addition, the insertion member 130' may be used in the shape of a ring, and the receiving member 140 corresponding to the insertion member 130' may employ a coupling structure corresponding to the shape of the ring.

However, the present invention is not limited to the structure shown in FIG. 4, and the insertion member and the receiving member shown in FIG. 4 may have mutually opposite structures and may use a karabiner, a snap fastener, a typical key ring shape, and various buttons or strings. The coupling relationship between the coupling member 7 and the connection band 120 can be easily realized by those skilled in the art based on the above-described patent documents, so that the details thereof will be omitted.

The pocket part 111 has a pouch shape to receive the towel body 110 therein, and a portion of the towel body 110, for example an upper portion of the towel body 110 may have a substantially triangular shape as shown in FIG. 3.

In addition, the pocket part 111 is formed integrally with the towel body 110 by backstitches or an adhesive except for an entrance of the pocket part 111 used to insert the towel body 110. As shown in FIG. 3*a*, a corner part α of the pocket part coupled to the connection band 120 has preferably an angle in the range of about 50° to about 70°, more preferably, an angle of 60°. In addition, in the following description, the terminology "a first portion of the pocket part 111', refers to a part to form the receiving space by providing an entrance together with the towel body 110 in the state shown in FIG. 3, and the terminology "a second portion of the pocket part 111' refers to an outer portion of the receiving space formed integrally with the towel body 110 in the state shown in FIG. 3.

The angle of the corner part α is provided in the range of about 50° to about 70° in order to prevent the towel body 110 from being out of the pocket part 111 after the towel body 110 is embedded in the pocket part 111 without an additional blocking unit for the entrance of the pocket part 111 as described above. Accordingly, the towel body 111 has a triangular shape similar to that of the pocket part 111 as shown in FIG. 3. However, the present invention is not limited thereto, and, if only the pocket part 111 is formed in the shape shown in FIG. 3, and the entire portion of the towel body 110 has a size sufficient to be embedded in the pocket part 111, the remaining portion of the towel body 110 may have a rectangular shape or a circular shape.

As described above, preferably, the pocket part 111 may be formed of the same material as that of the towel body 110, or the first portion of the pocket part 111 may be formed of a fabric having elasticity different from that of the towel body 110. In other words, for example, the first portion of the pocket part 111 may preferably include spandex which is fiber to maintain elasticity. In addition, the fiber to maintain the elasticity may be provided at the first and second portions of the pocket part 111 or at one surface of the pocket part 111.

As shown in FIG. 3*b*, a first portion 111' of the pocket part may be provided in the shape of a mesh for the ventilation of the received towel body.

As the first portion and/or the second portion of the pocket part 111 is formed of the fiber to maintain elasticity as described above, the towel body 110 embedded in the pocket part 111 is pressed to prevent the towel body 110 from being out of the pocket part 111.

Hereinafter, another embodiment of the present invention will be described with reference to FIGS. 5 to 7.

Figure 5:
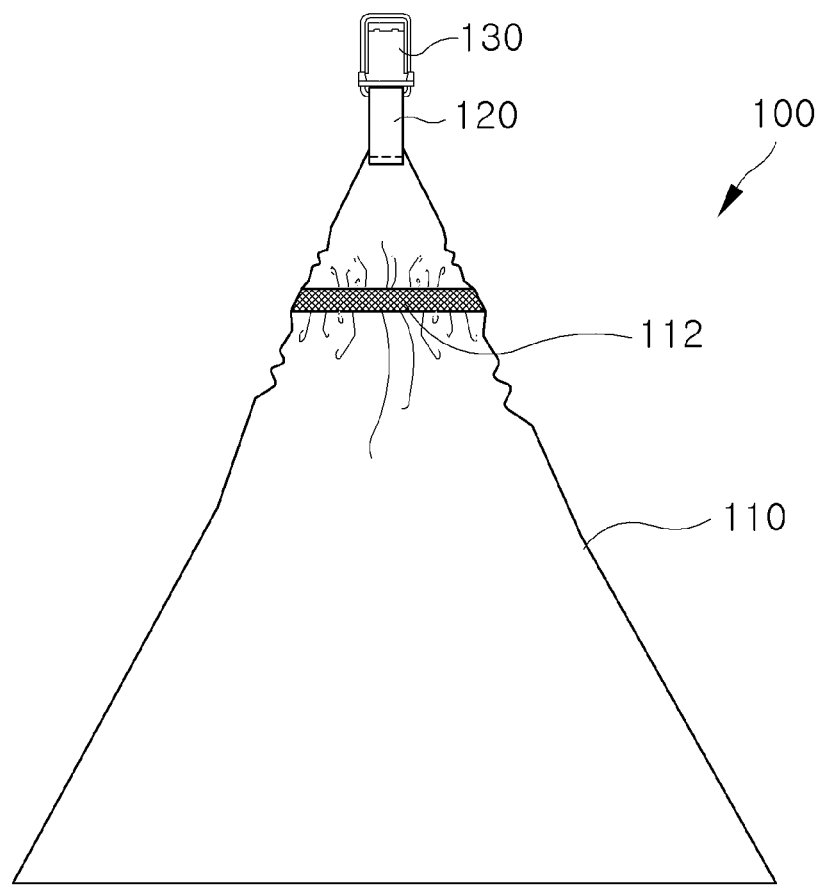
FIG. 5 is an elevational view showing another example of a pocket part according to the present invention.
Figure 6:
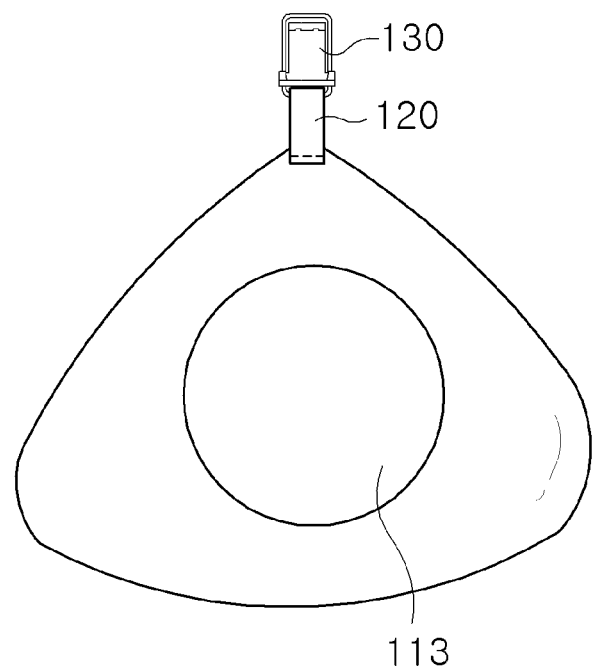
FIG. 6 is an elevational view showing still another example of a pocket part according to the present invention.

FIG. 5 is a perspective view showing a pocket part according to another embodiment of the present invention, and FIG. 6 is a perspective view showing a pocket part according to a still another embodiment of the present invention. FIG. 7 is a view showing the use state of the embodiment shown in FIG. 6.

As shown in FIG. 5, according to another embodiment of the present invention, a band part 112 having elasticity is provided at the first portion of the pocket part 111. The band part 112 may include various band parts if the towel body 110 and the pocket part 111 are formed of the same material, and a lower end of the first portion of the pocket part 111 is backstitched. In other words, when fabricating the towel 100 according to the present invention, the band part 112 is first backstitched to the first portion of the pocket part 111, and the front edges of the band part 112 are backstitched to a top surface of the towel body (see FIG. 5). In this case, the fabrication process is simplified, so that the fabrication cost can be saved.

Meanwhile, according to the present invention, as shown in FIG. 6, an anti-slip member 113 is provided on an outer surface of the first portion or the second portion of the pocket part 111 to prevent the portable terminal 5 from being slipped.

Figure 7:
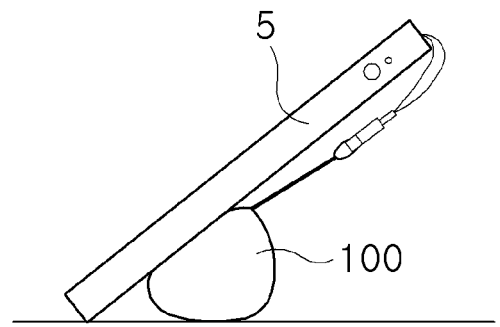
FIG. 7 is a view showing the use state of the embodiment shown in FIG. 6.

The anti-slip member 113 is provided and attached to a back surface of the portable terminal 5, so that the pocket part 111 can be used as a support for the portable terminal 5 as shown in FIG. 7. In other words, a portable terminal developed through a recent electronic technology serves as a personal computer instead of a simple communication unit. For example, when a user views a moving picture by using the portable terminal, the pocket part 111 can be usefully used as the support for the portable terminal 5.

For example, the above-described anti-slip member 113 can be easily realized by attaching a flexible rubber material having a function of preventing the slipping of the portable terminal 5 to a portion of the outer surface of the first portion or the second portion of the pocket part 111 in a substantially circular shape.

Hereinafter, embedding the towel body 110 into the pocket part 111, which is a subject matter of the present invention, will be described with reference to FIG. 8.

Figure 8:
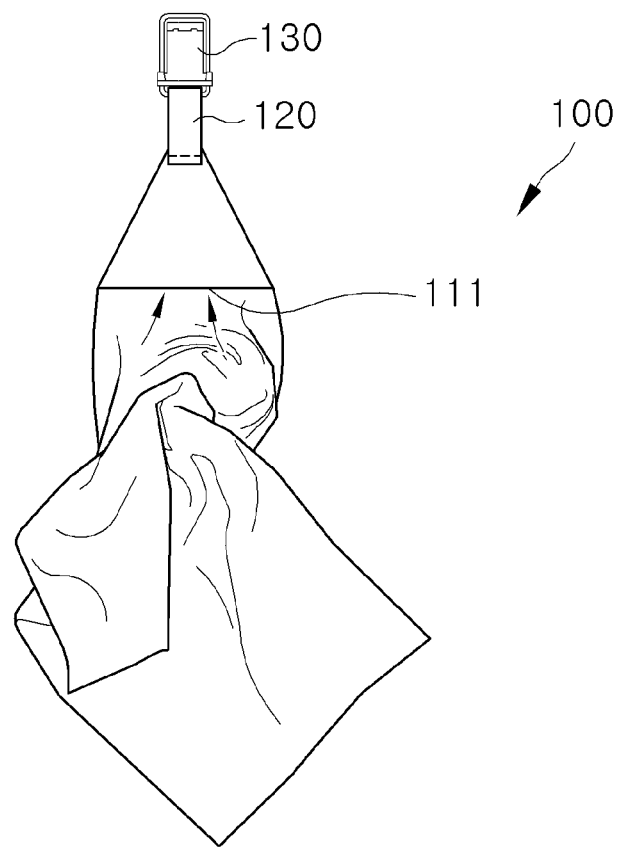
FIG. 8 is a view showing a procedure of embedding the towel body shown in FIG. 3 into the pocket part.

FIG. 8 is a view to explain a procedure of embedding the towel body 110 into the pocket part as shown in FIG. 3.

For example, the towel body 110 is withdrawn out of the pocket part 111 in order to clean the contamination of the portable terminal 5 in the state shown in FIG. 4. According to the present invention, since the entrance of the pocket part 111 is not covered with any member, the towel body can be easily withdrawn.

Accordingly, when the towel body 110 is embedded in the pocket part 111 again after the towel body 110 is used in the state of the towel body 110 shown in FIG. 3, the towel body 110 is easily embedded by folding the towel body 110 from an upper portion of the towel body 110, that is, a portion of the towel body 110 around the pocket part 111 as shown in FIG. 8.

In addition, when the towel 110 is seriously contaminated by the repeated use of the towel 100, the towel 110 may be washed by separating the insertion member 130 from the receiving member 140 (see the state shown in FIG. 3).

Accordingly, since the towel 100 according to the present invention has a sufficiently large size different from a disposable cleaning tool having a smaller size, the towel 100 cannot but sufficiently clean the contamination of the portable terminal, but can be repeatedly used through washing. Accordingly, the environment pollution caused by the use of the disposable cleaning tools can be prevented.

In addition, as the towel body 110 can be decoupled due to the coupling member in the towel 100 according to the present invention, the towel body 110 can be excellently washed, and can be replaced with new one if the towel body 110 is worn out. In addition, since the towel body 110 can be decoupled, the towel body 110 is not restricted in the use range thereof, so that the use convenience of the towel can be ensured.

In addition, according to the present invention, a portion of the pocket part 111 can be utilized for an advertisement.

Hereinafter, still another embodiment of the present invention will be described with reference to FIGS. 9 to 12.

Figure 9:
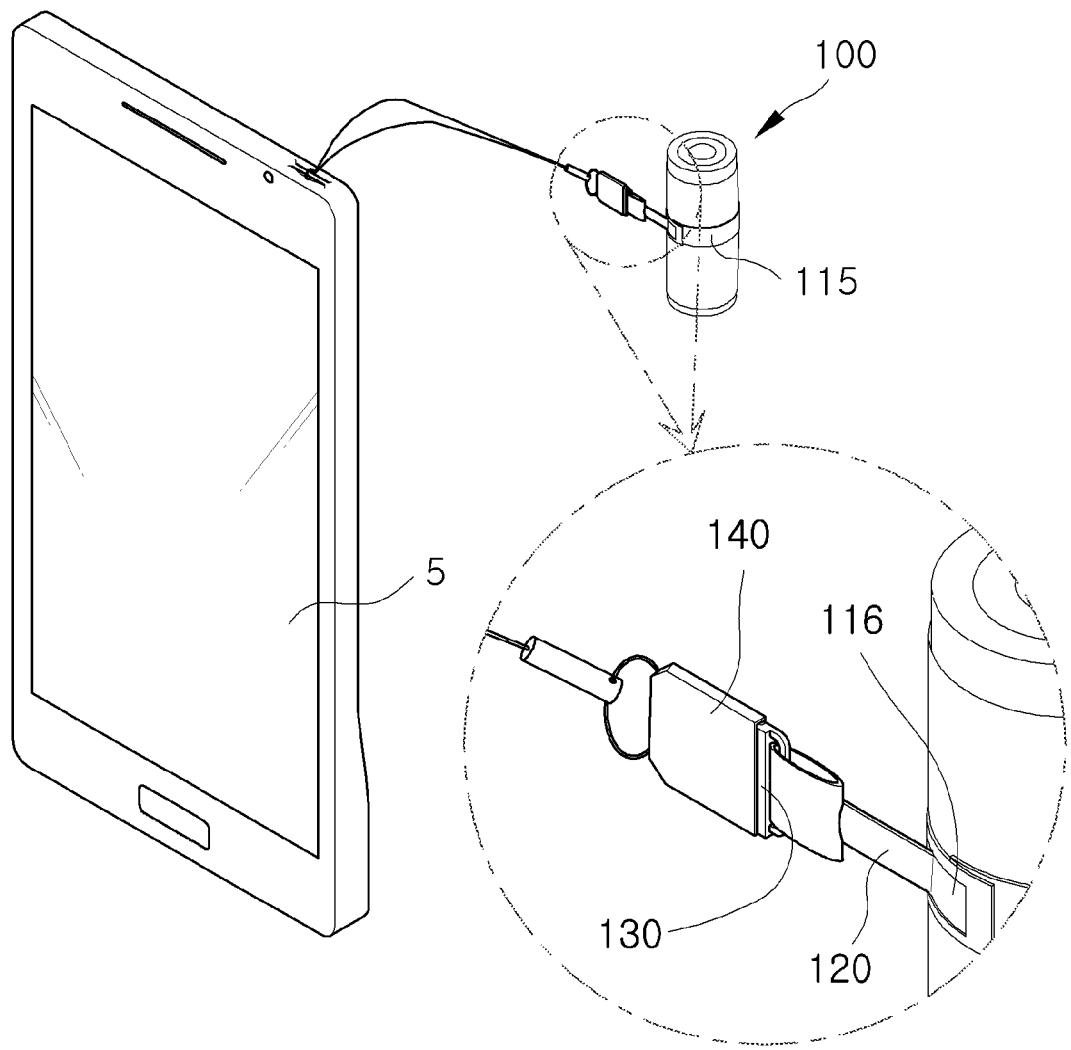
FIG. 9 is a view showing the state that a bound towel body is coupled to a portable terminal.
Figure 10:
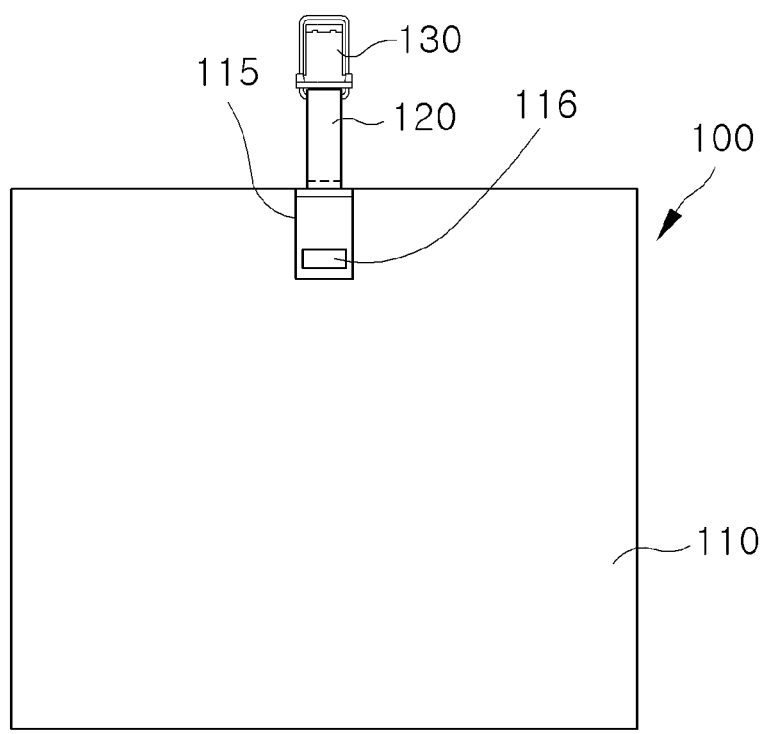
FIG. 10 is an elevational view showing a towel according to still another embodiment of the present invention.

FIG. 9 is a view showing the state that a towel body is bound and coupled to a portable terminal, and FIGS. 10 and 11 are perspective views showing a towel according to still embodiment of the present invention.

As shown in FIGS. 9 and 10, a towel 100 according to still another embodiment of the present invention is coupled to a portable terminal through, for example a strap, and includes a towel body 110, a gusset part 115 provided on one surface of the towel body 110 to bind the towel body, a connection band 120 formed on an opposite surface of the towel body 110 corresponding to the gusset part 115, and a coupling member mounted in the connection band 120.

In addition, the gusset part 115 is provided therein with an insertion hole 116 through which the insertion member 130 of the coupling member passes. The insertion hole 116 may have various sizes if the insertion hole 116 is provided at an end portion of the gusset part 115 and has a size allowing an insertion member 130 to pass therethrough.

Figure 11A:
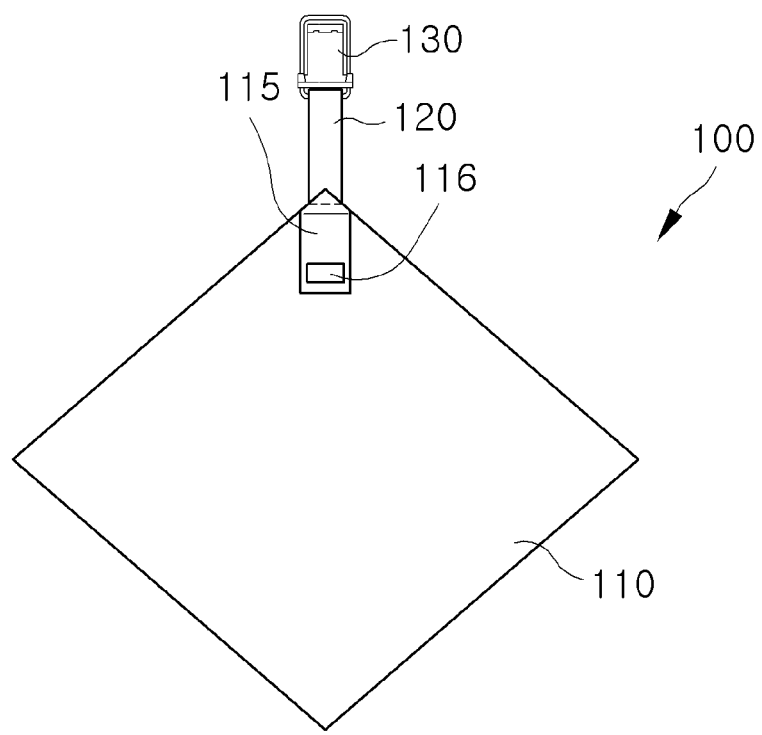
FIG. 11A is an elevational view showing a towel showing another embodiment of the present invention.
Figure 11B:
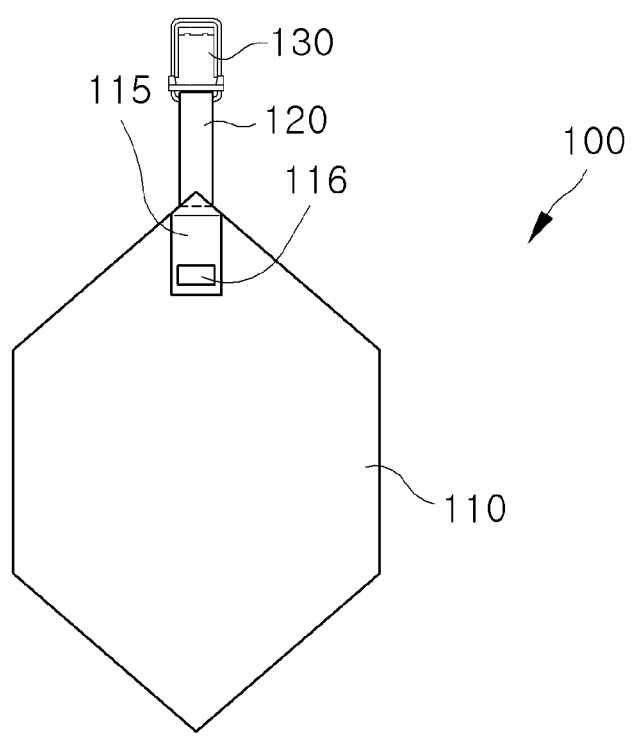
FIG. 11B is an elevational view showing a towel showing another embodiment of the present invention.

Although FIG. 10 shows that the gusset part 115 is provided at a central portion of one side of the towel body 110, the present invention is not limited thereto, and the gusset part 115 may be provided at a corner part as shown in FIGS. 11a and 11b. Further, the towel body 110 according to the present embodiment has a rectangular shape as shown in FIGS. 10 and 11a different from those of the above embodiments, but the present invention is not limited thereto. In other words, the towel body 110 according to the present embodiment may have a triangular or pentagonal shape or may have a hexagonal shape as shown in FIG. 11b, that is, may have a polygonal shape.

In addition, the gusset part 115 is fixed to the towel body by backstitching a remaining portion of the gusset part 115 except for the insertion hole. The backstitching is performed only with respect to an end portion of the gusset part 115 opposite to the insertion hole 116 so that the insertion hole 116 is sufficiently decoupled from the towel body 110.

Figure 12:
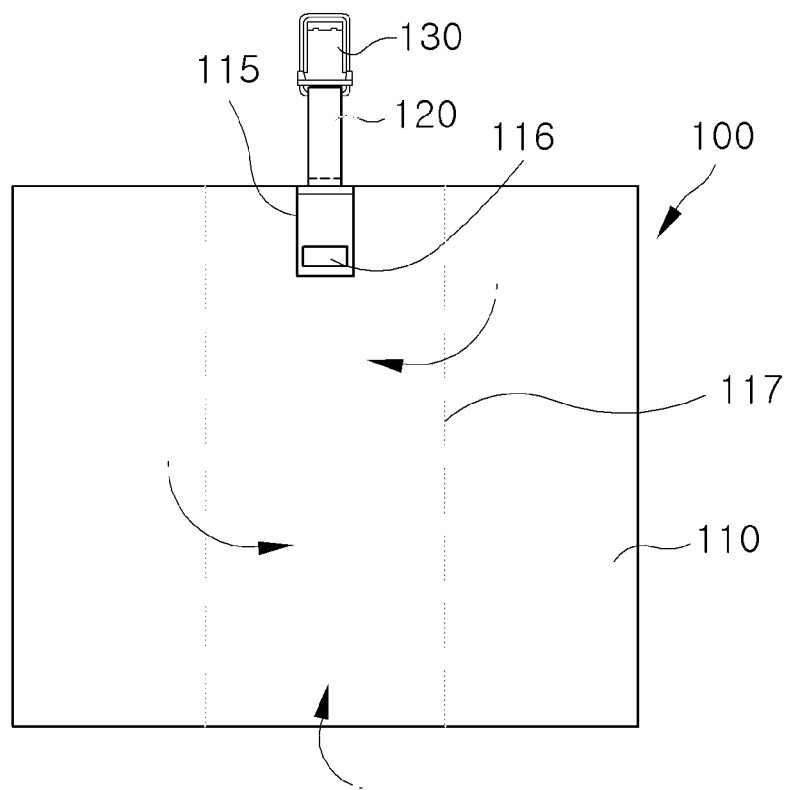
FIG. 12 is a perspective view showing the towel having a guide line to guide the binding procedure.

A guide line 117 is provided on one surface of the towel body 110 according to the towel body 110 to guide a binding procedure as shown in FIG. 12 when the towel body 110 is bounded after the towel body 110 is used so that the state of the towel body 110 shown in FIG. 9 is maintained. Accordingly, the user first folds the left and right sides of the towel body 110 along the guide line 117 shown in FIG. 12, rolls up the towel body 110 from a portion of the towel body 110 without the gusset part 115, and finally passes the insertion member 130 through the insertion hole 116 to bind the rolled-up towel body 110. The guide line 117 may be formed through, for example screen printing or embossing by heat treatment.

In addition, since the use and the cleaning of the towel body 110 shown in FIGS. 9 to 12 are the same as those of the previous embodiment, the details thereof will be omitted.

Meanwhile, although the embodiment has been described in that the gusset part 115 is provided therein with the insertion hole 116, the present invention is not limited thereto. In other words, a fastener or snap buttons serving as bonding units are provided on both surfaces of the gusset part 115 or the connection member instead of the insertion hole 116 to bind the towel body 110.

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The towel according to the present invention is applied to removing moisture such as sweat or foreign matters on the surface of a portable terminal, glasses, and an optical device.

The invention claimed is:

1. A towel configured to be coupled to a portable terminal, a bag, a purse, a key holder, a diary, or a handbag, the towel comprising:
    a towel body;
    a pocket part disposed on one surface of the towel body to receive the towel body;
    a connection member coupled to the pocket part; and
    a coupling member mounted in the connection member,
    wherein the pocket part has a triangular shape, wherein the pocket part is made of a same material as a material constituting the towel body, and wherein a corner portion of the pocket part coupled to the connection member has an angle in a range of 50° to 70°.

2. The towel of claim 1, wherein the pocket part includes fiber to maintain elasticity different from the material constituting the towel body.

3. The towel of claim 1, wherein the pocket part has a band part having elasticity.

4. The towel of claim 1, wherein the pocket part is in a mesh shape.

5. The towel of claim 1, wherein the pocket part includes an anti-slip member.

6. The towel of claim 5, wherein the coupling member includes a strap or a string.

* * * * *